United States Patent [19]

Stahl

[11] 4,257,293

[45] Mar. 24, 1981

[54] MACHINE FOR TRIMMING THE EDGES OF METAL CONTAINERS

[75] Inventor: William Stahl, Chatham, N.J.

[73] Assignee: National Manufacturing Company Inc., Chatham, N.J.

[21] Appl. No.: 58,107

[22] Filed: Jul. 16, 1979

[51] Int. Cl.³ ............................................. B23D 21/00
[52] U.S. Cl. ........................................ 83/193; 83/519
[58] Field of Search ................................ 83/192–194, 83/519, 914

[56] References Cited

U.S. PATENT DOCUMENTS

| 345,365 | 7/1886 | Cheswright | 83/194 X |
| 925,070 | 6/1909 | Adams | 83/193 X |
| 1,769,303 | 7/1930 | Wevner | 83/192 |
| 2,074,547 | 3/1937 | Hessenbruch | 83/519 X |
| 2,374,301 | 4/1945 | Olney | 83/194 X |
| 3,913,435 | 10/1975 | Stahl | 83/193 |

*Primary Examiner*—J. M. Meister
*Attorney, Agent, or Firm*—Albert F. Kronman

[57] ABSTRACT

A machine for trimming the edges of metal containers in which a plurality of upstanding, vertically disposed cams are positioned upon a table. A plurality of sliding cutters are provided equal in number to the cams. The cams are driven up and down by a vertically reciprocating platen below the table by means of a power source, a crank shaft and an arm coupling the crank shaft and platen. Various cam face shapes and cam followers are disclosed to provide the cutting sequence of the cutters.

13 Claims, 8 Drawing Figures

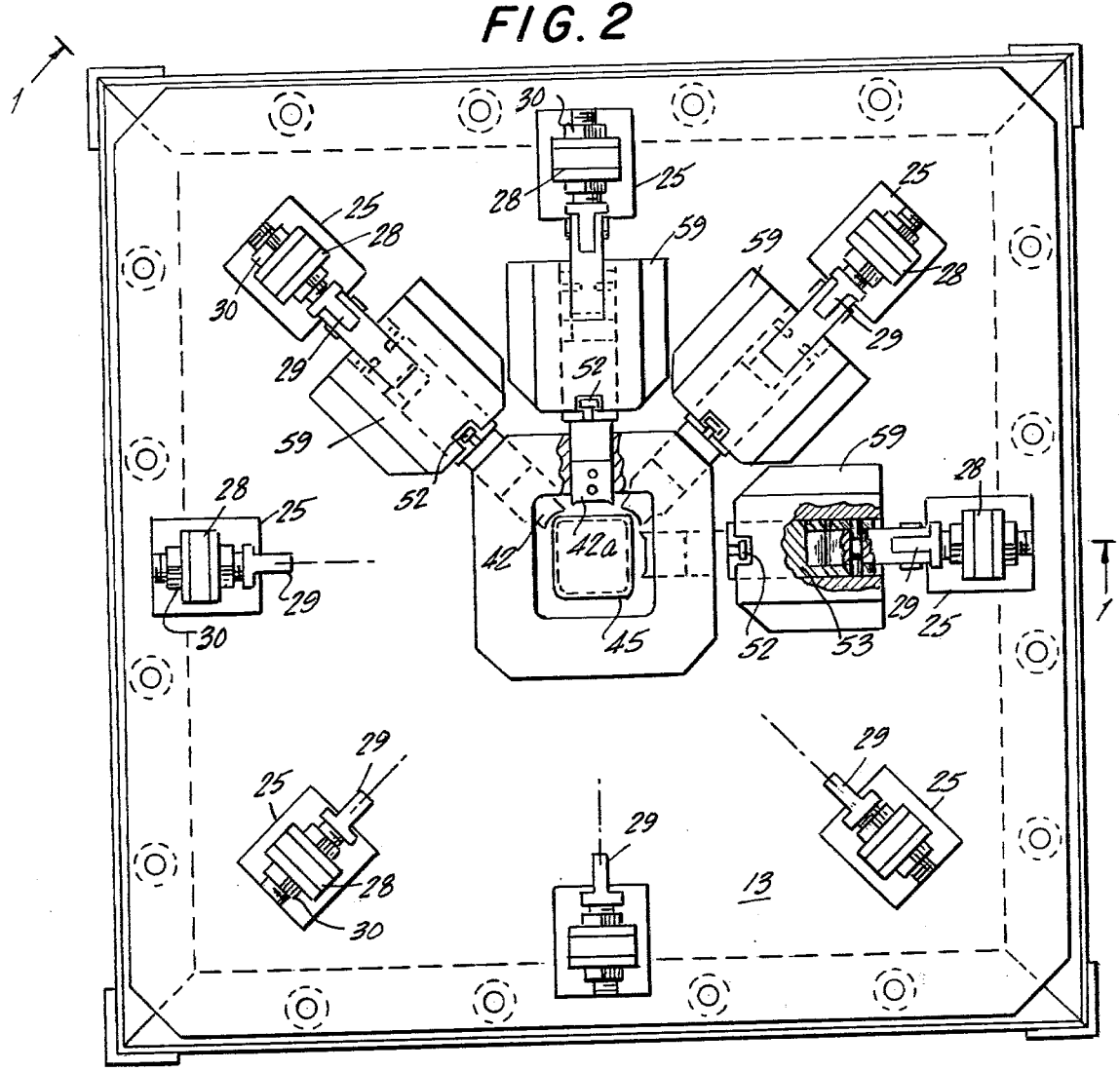
FIG. 2
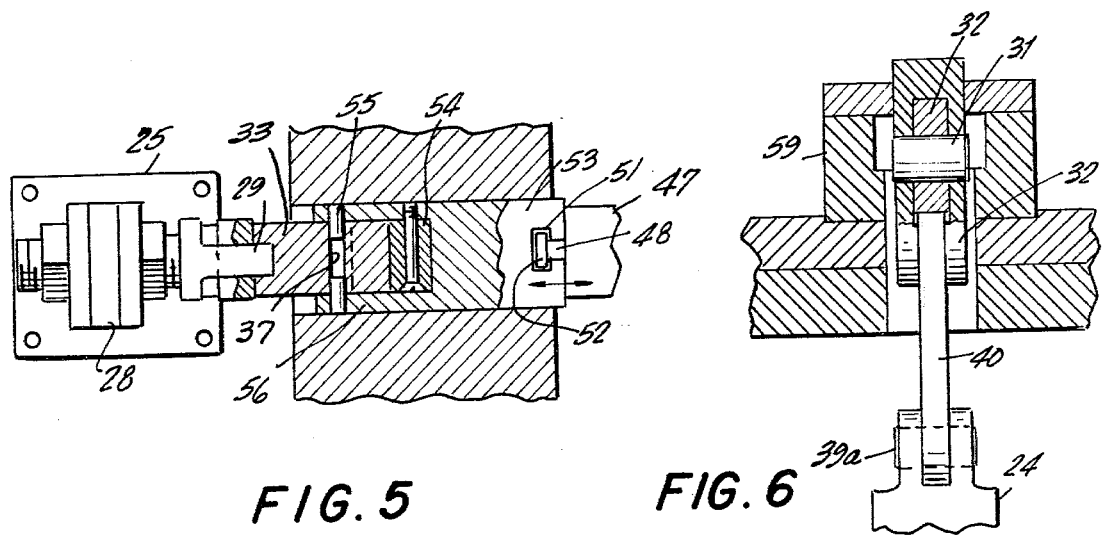
FIG. 5
FIG. 6

MACHINE FOR TRIMMING THE EDGES OF METAL CONTAINERS

BACKGROUND OF THE INVENTION

Trimming the uneven edges of metal containers formed by a deep draw process in order to bring them to the desired length and shape presents many machine problems, particularly where harder metals such as stainless steel or other alloyed materials form the container body. Despite the use of harder cutters and heavy duty construction, considerable wear is encountered, requiring frequent adjustment of the machine elements as well as replacement and sharpening of cutting tools. The amount of energy required for each cutting operation and the ease of machine servicing and safety are also important.

It is well-known to trim metal containers by means of a plurality of cutters driven by a flat cam plate rotably mounted so as to encircle the outer or non-cutting ends of the cutters. One or more cam surfaces on the plates bear against followers on the cutters so that rotation of the cam plate drives the cutters into and out of their trimming positions.

It is also well-known to drive the trimming cutters by means of complicated rocker arms, toggle arrangements and bell crank levers.

The container trimming machine of the present invention employs a vertically disposed cam for each cutter coupled to a vertically reciprocating platen. Each cam is individually adjustable with respect to its associated cutter and is readily removed together with its cutter for maintenance. The work area for loading and unloading the containers is uncluttered and, therefore, safer than prior art machines.

SUMMARY OF THE INVENTION

The trimming machine, according to the present invention, comprises a table upon which there is secured a plurality of spaced cutters. Each cutter is driven by means of a vertically disposed cam. The cams are each swingably secured to posts carried by the table. A drive platen mounted for vertical reciprocating movement is carried beneath the table and coupled to each of the cams. An upstanding mandrel at the center of the table and between the cutters receives the container to be trimmed. As the platen reciprocates the cams swing up and down to drive cutters into and out of their metal trimming positions.

BRIEF DESCRIPTION OF THE FIGURES

In the accompanying drawings forming part hereof, in which drawings similar parts have been given the same reference numeral:

FIG. 2 is a top plan view of the trimming machine of FIG. 1 with certain parts omitted for the sake of clarity.

FIG. 5 is a fragmentary plan view partly in section of a cutting station of FIG. 2, somewhat enlarged.

FIG. 6 is a sectional view taken on line 6—6 in FIG. 1, somewhat enlarged.

DETAILED DESCRIPTION

Figure 1:
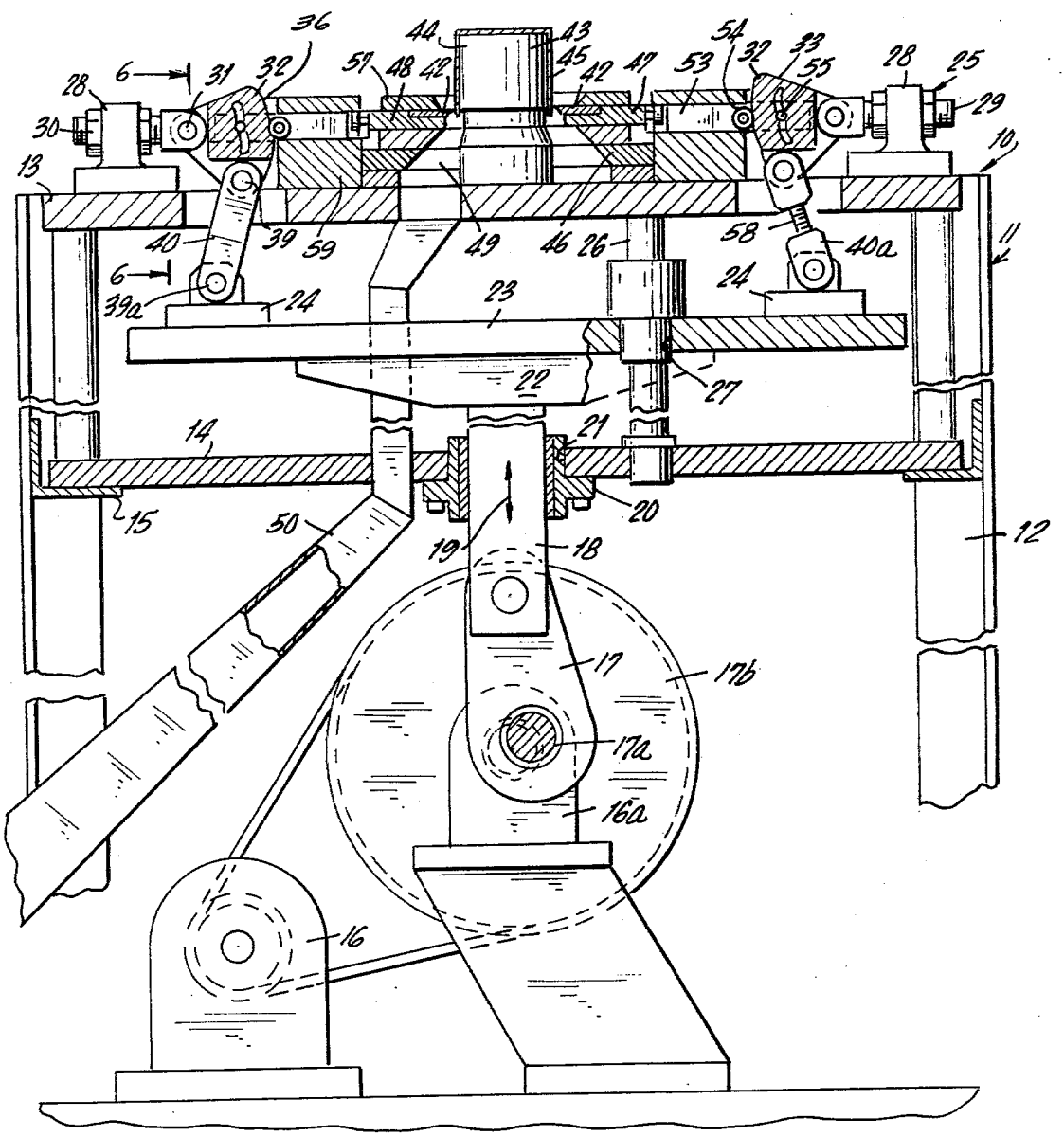
FIG. 1 is a sectional view taken on line 1—1 in FIG. 2 of a complete embodiment of the present invention.

Referring to the drawings and, particularly, to FIGS. 1 and 2,

Reference numeral 10 indicates a trimming machine having a frame 11 formed of upstanding legs 12 upon which there is a table 13. A bearing plate 14 is mounted upon angle irons 15 welded to the legs 12. A source of rotary power indicated diagramatically at 16 and comprising a motor and a clutch mechanism 16a is coupled by means of an arm 17 to a heavy shaft 18. The arm 17 is reciprocally driven by a crank shaft 17a rotated by a pulley 17b. The pulley 17b is coupled to the output shaft of the power source 16.

The crank shaft is preferably stopped at the 60° or 240° angles (known as the 2 and 8 0'clock positions) for loading or unloading containers since at these angles the forces required to restart the cycle are at their minimum.

The shaft 18 is freely carried within a bearing 20 secured within a bore 21 in the bearing plate 14. The upper end of the shaft 18 is secured to a platen 23. The platen 23 is free to move within the space formed by the legs 12, table 13 and bearing plate 14 in response to the movement of the shaft 18.

A plurality of pillow blocks 24 are secured to the top of the platen 23 is spaced relationship and corresponding in number to the number of cutting stations in the trimming machine. In the presently illustrated embodiment, eight such stations 25 are shown.

The table 13 is supported adjacent its center portion by posts 26 secured between the table 13 and the bearing plate 14.

The platen 23 is suitably bored as indicated at 27 to freely receive the post 26 therethrough. In this manner, the table 13 is prevented from deflecting by reason of the forces set up during the operation of the trimming machine.

The cutting stations 25 consist of mounts 28 secured to the top of the table 13 in spaced relationship to each other and also to the center of the table. The mounts 28 are internally threaded to receive eye bolts 29. The eye bolts 29 are adjustably secured in place by means of nuts 30 which are threaded on the eye bolts and which bear against the front and back of the mounts 28. Each of the eye bolts is provided with a pivot pin 31 by means of which a cutter drive cam 32 is swingably secured to the eye bolt.

The cutter drive cams 32 best shown in FIGS. 3a, 3b, 4a, 4b consist of a somewhat triangular shaped plate 33 bored at its apex 34 as indicated at 35 to receive the pivot pin 31. A cam surface 36 is formed on the cam plate 33 opposite the bore 35 and an elongated, closed cam 37 is provided in the cam plate between the bore 35 and the cam face 36. A second bore 38 is provided in each of the cam plates to receive a small stub shaft 39 best shown in FIG. 1. The stub shaft 39 serves to couple a link 40 to the cutter drive cam 32. The opposite end of the link 40 is freely coupled to the pillow block 24 by means of a second stub shaft 39a.

Figure 3A:
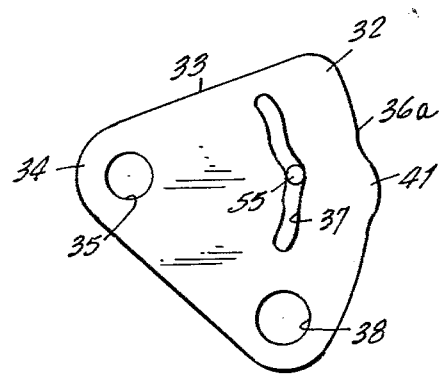
FIGS. 3a, 3b, 4a, 4b, are side views of drive cams useful in the trimming machine.
Figure 3B:
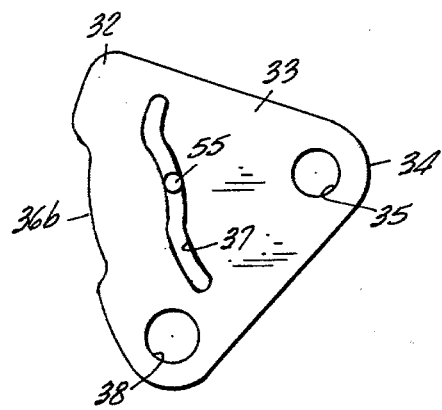
Figure 4A:
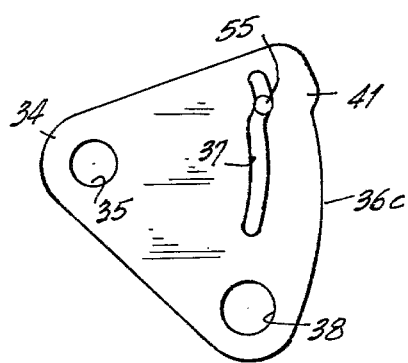
Figure 4B:
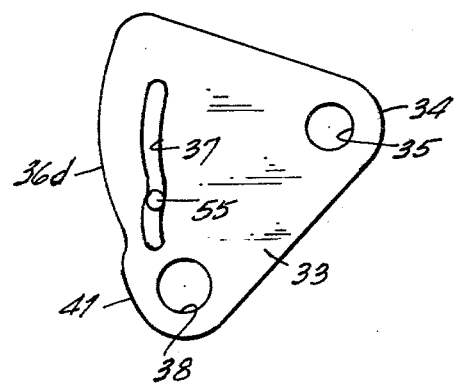

It will be seen from an examination of FIGS. 3a, 3b, 4a, 4b that the cam faces 36a–36c may have different configurations depending upon the number of strokes which the cutters that are driven by the cam face are intended to make during each cycle. The cam face of FIG. 3a is designed to make one cut on the upward travel of the platen 23 and one cut on the downward travel of said platen. The cam face of FIG. 3b is designed to make two cuts on the upward travel and two cuts on the downward travel. The cam faces of FIGS. 4a and 4b are formed to make a single cut on the upstroke and a single cut on the downstroke respectively. The position of the lobes 41 on each of the cam faces 36 will cause the cut or cuts to be made at a desired position of the platen 23 and its drive and drive arm 16, 17. It is to be understood that certain positions of the drive are more favorable that others for resuming the operation of the cutting machine following each complete cutting cycle. The present structure is capable of starting the cutting operation, moving through the cutting operation, replacing the trimmed container with an untrimmed container and resuming the operation with a minimum expenditure of energy.

In addition, and as shown in FIG. 2, the lobes 41 are so arranged in their respective stations that opposed cutting blades 42 will be brought into the cutting position while other blades 42a are in a retracted position. The precise location of the lobes is well-known in the cam art and need not be further discussed.

Referring to FIG. 1, it will be seen that a mandrel 43 is secured to the table 13 at the table's center and extends upwardly from the surface of the table. The mandrel 43 is provided with a top portion 44 which conforms to the inner surface of the container 45 which is to be trimmed. Surrounding the mandrel 43 and supported by the table 13 are a series of plates 46. The plates 46 are centrally bored and of a cumulative thickness so as to support tool holders 47 at each of the cutting stations 25 upon a plane which will bring the cutting blades 42 to bear against the container 45 at the proper location for the desired trimming. The plates 46, therefore, serve as supports for the tool holders to assure proper disposition of the cutter blades 42. The opening 49 provided by the bores in the plates 46 permits waste material from the containers 45 to leave the trimming machine by way of the chute 50.

Each of the tool holders 47 is provided with a button 52 which is received within a "T" shaped slot 51 in a cam follower support 53 as best shown in FIG. 5 at 48. A cam follower roller 54 is secured at the closed end portion of the follower support which has a forked part 56. A portion of the cutter drive cam 32 is freely located within the forked portion so that its cam face 36 bears against the roller 54.

A follower pin 55 supported at each end by the cam follower support 53 and traversing the forked part 56 of the cam follower support freely rides within the closed cam 37 in each of the cam plates 33. The cam follower support is slidably carried within a block 59 secured to the top of the table 13.

It will be seen from an examination of FIGS. 3, 3a, 4, 4a that the closed cam follows the configuration of the cam face 36 in each of the embodiments disclosed. Accordingly, as the cam plate 33 is moved up and down, the cutting tool will be driven toward the container by the cam face 36 and will be withdrawn from the cutting position by the operation of the follower pin 55 within the closed cam 37.

The tool holders 47 are guided in their travel by a hold down plate 57 which is suitably bored to receive the mandrel 43 and container 45, therethrough.

It will be noted from an examination of FIG. 1, that the link 40, at the left of the figure, is illustrated as a solid member.

It is within the purview of the present invention to provide an adjustable screw 58, as shown at the right of FIG. 1, and a two part link 40a so that the position of cam plate 33 may be accurately adjusted when the trimming machine is initially set up. The extent of the cutting movement, as previously indicated, can be adjusted by the nuts 30 on the eye bolts 29, so that small amounts of wear which may be encountered during continued use of the trimming machine, may be compensated for in a minimum amount of tme and without disassembly of the apparatus. It will be understood that when cutters 42 are removed for sharpening and thereafter replaced in the trimming machine accurate readjustment is highly desirable. Removal of the cutters with a minimum amount of machine disassembly is achieved by the presently disclosed structure merely by removing the hold down plate 57 and sliding them out of the "T" shaped slots 51.

In addition to the ease of adjustment, the present device provides an uncluttered working area for the operator since most of the mechanism is positioned below the mandrel 45 which is loaded and unloaded during the trimming operation.

Having thus fully described the invention, what is desired to be claimed and secured by letters patent is;

1. A machine for trimming the open ends of containers comprising:
   a. a table having an aperture therein;
   b. spaced supports for said table;
   c. a source of reciprocal power beneath the table and within the spaced supports;
   d. a reciprocable platen between the table and the said power source;
   e. an arm operatively interconnecting the power source to the platen;
   f. a plurality of spaced cutting stations carried by the table and spaced from the center of said table.
   g. a mount in each of the cutting stations;
   h. bolt means threadably received with each of the mounts radially disposed with respect to the table aperture;
   i. a vertically disposed cam plate swingably secured to each of the bolts;
   j. a cam face on each of the cam plates;
   k. a link operatively connected between each of the cam plates and the platen;
   l. an upstanding block secured to the table at each cutting station between the said station and the table aperture;
   m. a tool holder slidably received within each of the blocks and disposed in the path of each of the cam faces;
   n. cutting blades carried by the tool holders extending into and above the table aperture;
   o. a mandrel secured at one end to the table and extending upwardly from the said table to receive the container to be trimmed thereon;
   p. cam follower means cooperating with each of the tool holders and driven by the cam faces to move the cutting blades into cutting engagement with the container; and
   q. means carried by the cam plates to retract the cutting blades following said cutting engagement.

2. A machine according to claim 1 in which an aperture is formed about the mandrel by a plurality of plates, each having an opening therein disposed upon the table in stacked relationship.

3. A machine according to claim 1 in which a bearing plate is carried below the platen by the spaced supports and is bored to receive the arm therethrough.

4. A machine according to claim 3 in which the table is further supported by at least one post carried by the bearing plate and disposed so as to prevent table deflection.

5. A machine according to claim 1 in which the platen is provided with a pillow block for each of the cutting stations to swingably support one end of the link.

6. A machine according to claim 1 in which the cutting station bolt is an eye bolt having a nut therein disposed on each side of the mount whereby the position of the eyebolt may be adjusted and secured within the mount.

7. A machine according to claim 1 in which the links comprise an internally threaded first portion, a second portion and a screw member received within said threaded portions for length adjustment of said links.

8. A machine according to claim 1 in which each of the cam faces includes at least one lobe extending therefrom in the direction of the mandrel.

9. A machine according to claim 1 in which each of the tool holders is coupled to a cam follower support disposed between the tool holder and a cam face.

10. A machine according to claim 9 in which the tool holder is provided with a button opposite the cutting blade end of said tool holder, the cam follower support is provided at one end with a "T" shaped recess to receive the button therein and a forked portion opposite the said recessed end to receive a cam plate therebetween.

11. A machine according to claim 10 in which the cam follower means is a roller carried by the cam follower support within the forked portion in contact with the cam face.

12. A machine according to claim 10 in which the means to retract the cutting blades comprises an elongated closed cam slot in each of the cam plates and a pin freely received within the cam slot at one end of the pin and secured to the cam follower support within the forked portion thereof.

13. A machine according to claim 1 in which the source of reciprocal power includes a crank shaft, a source of rotary power and a clutch between the crank shaft and power source to stop the crank shaft at the 2 or 8 o'clock position for loading and unloading the containers to be trimmed.

* * * * *